J. A. THOMAS.
HARROW TOOTH CLIP.
APPLICATION FILED APR. 23, 1921.
1,435,092.
Patented Nov. 7, 1922.
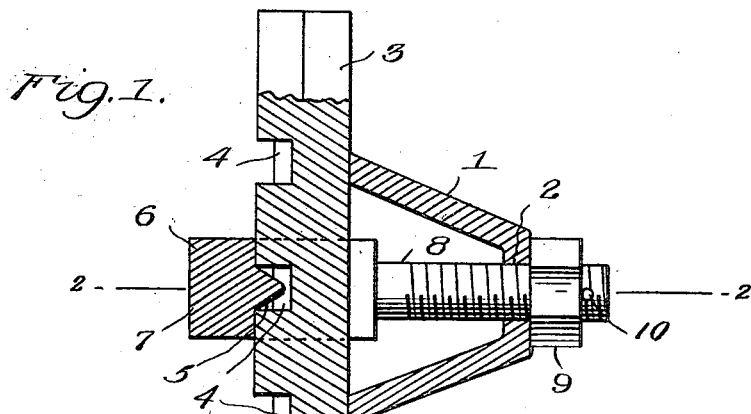
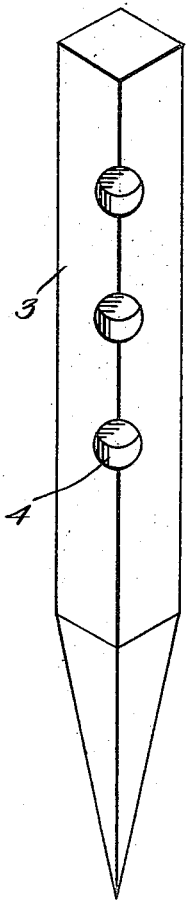
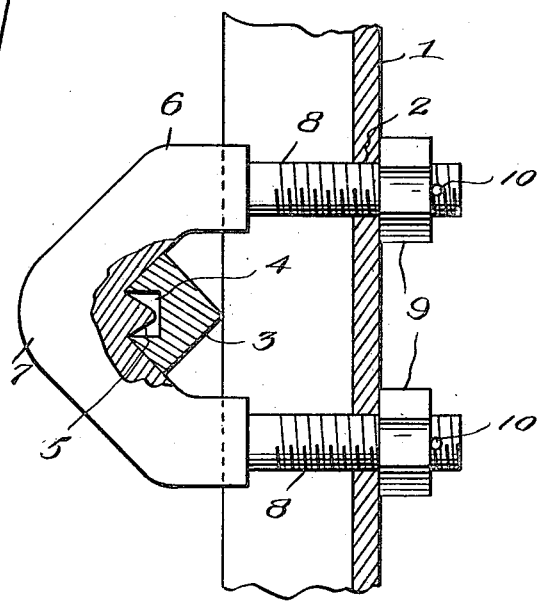
JEPTHA A. THOMAS
INVENTOR
BY Victor J. Evans
ATTORNEY Patented Nov. 7, 1922.

1,435,092

UNITED STATES PATENT OFFICE.

JEPTHA A. THOMAS, OF PENNVILLE, INDIANA.

HARROW-TOOTH CLIP.

Application filed April 23, 1921. Serial No. 463,788.

*To all whom it may concern:*

Be it known that I, JEPTHA A. THOMAS, a citizen of the United States, residing at Pennville, in the county of Jay and State of Indiana, have invented new and useful Improvements in Harrow-Tooth Clips, of which the following is a specification.

This invention relates to a harrow tooth construction and has for its primary object the provision of means whereby the tooth can be prevented from becoming loosened, and further the nuts held against accidental removal.

An object of the invention is the novel construction of clip so as to readily hold the tooth in place.

A feature of the invention is the arrangement and engagement of the lug with the holes in the tooth so that the latter will be positively held against sliding.

With these and other objects in view the invention will be better understood from the following detailed description taken in connection with the accompanying drawing wherein:

Fig. 1 is a vertical sectional view showing the tooth in place.

Fig. 2 is a horizontal sectional view.

Fig. 3 is an elevation of the tooth.

Again referring to the drawing illustrating one of the many constructions of my invention the numeral 1 designates an ordinary harrow bar which is provided with a pair of spaced openings 2. My improved tooth 3 is provided with a series of holes 4 so as to be adjustably associated with the lug 5 on my improved form of clip 6.

It will be noted that the clip has a head portion 7 of a shape to tightly embrace the tooth and which is further provided with a pair of parallel shanks 8 which are threaded and pass through the openings 2 so as to be engaged by the nuts 9. The nuts are held against accidental dislocation by the cotter pin 10.

From the foregoing description taken in conjunction with the accompanying drawing it will be apparent that I provide a structure that will positively lock the various parts in position in such a manner that they cannot become loosened in the use of the harrow. By referring to the drawing it will be readily seen that the tooth is positively held against dislocation due to the arrangement of the lug with the holes.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A harrow tooth construction comprising a tooth provided with a series of holes, and an attaching clip for the tooth having a lug adapted to engage in either said holes for the purpose set forth.

2. A harrow tooth construction in combination with a bar provided with a pair of openings, a tooth having a series of holes, and a clip having a lug adjustably associated with the holes and threaded shanks passed around the tooth and through said openings, and nuts for clamping the shanks in place.

3. A harrow tooth construction in combination with a bar having a pair of spaced openings, a tooth having a series of holes, and a clip embracing the tooth and having a lug adjustably associated with said holes, and a pair of threaded shanks passed through said openings and around each shank, a nut for each shank, and a cotter pin to prevent accidental dislocation of the nut.

In testimony whereof I affix my signature.

JEPTHA A. THOMAS.